United States Patent [19]

Spodig

[11] 4,190,540

[45] * Feb. 26, 1980

[54] PERMANENT MAGNETIC SEPARATOR FOR LIQUIDS

[76] Inventor: Heinrich Spodig, 4714 Selm-Bork, Netteberge 202, Fed. Rep. of Germany

[ * ] Notice: The portion of the term of this patent subsequent to Jan. 30, 1996, has been disclaimed.

[21] Appl. No.: 825,690

[22] Filed: Dec. 27, 1977

[30] Foreign Application Priority Data

Aug. 21, 1976 [DE] Fed. Rep. of Germany ....... 2637802

[51] Int. Cl.² ............................................. B01D 35/06

[52] U.S. Cl. .................................................. 210/222

[58] Field of Search ................ 210/222, 223; 209/221, 209/222, 223, 224, 228, 231

[56] References Cited

U.S. PATENT DOCUMENTS

| | | | |
|---|---|---|---|
| 2,717,080 | 9/1955 | Anderson | 210/222 |
| 2,729,333 | 1/1956 | Gardes et al. | 210/222 |
| 2,876,902 | 3/1959 | Varetramp | 210/223 |
| 3,341,021 | 9/1967 | Cassan | 210/222 |
| 3,439,808 | 4/1969 | Sommermeyer | 210/222 |
| 3,481,471 | 12/1969 | Spody | 210/222 |
| 4,137,174 | 1/1970 | Spody | 210/222 |

*Primary Examiner*—Theodore A. Granger
*Attorney, Agent, or Firm*—Wallenstein, Spangenberg, Hattis & Strampel

[57] ABSTRACT

Permanent magnetic separators for liquids to be purified which comprise one or more ferromagnetic catch and discharge bodies for the impurities contained in the liquid, which impurities are removed by means of at least one stripper from the effective surface, wherein said catch and discharge body or bodies is polarized from the outside, said catch and discharge body or bodies consisting of two bowl-shaped rotary bodies placed opposite each other and separated by an operating gap, and at least one of said catch and discharge bodies is positioned rotatably between two pole shoes placed opposite each other of a closed magnetic system. Additional features and particular embodiments include, among others, juxtaposed pairs of the catch and discharge bodies.

6 Claims, 5 Drawing Figures

PERMANENT MAGNETIC SEPARATOR FOR LIQUIDS

This invention relates to improvements in permanent magnetic separators for liquids. It is especially concerned with such separators of the type which comprise a ferromagnetic catch and discharge body for the impurities contained in the liquid, which impurities are removed by means of a stripper from the effective surface. The catch and discharge bodies of such separators as are known to the prior art are of roller-like design, with the rollers being arranged in a box-like flow-through housing and wherein the rollers are polarized from the outside by accommodating the magnets between housing and roller and/or in the roller and by connecting them with one pole via the shaft of the roller to the housing. However, only a limited space is available in the arrangement of the magnets, so that limits are imposed upon the magnetizability. In accordance with the present invention, the stray fields which are present in the separators of the prior art are essentially eliminated and the effectiveness of the magnetic separators is substantially improved.

In my copending application, Ser. No. 821,633 filed Aug. 4, 1977 now U.S. Pat. No. 4,137,174, issued June 30,1979; entitled Permanent Magnetic Separator For Liquids, as described in West Germany Application No. P26 35 858.7, filed Aug. 10, 1976, the disclosure of which said copending U.S. patent application is incorporated herein by reference, I have disclosed improved permanent magnetic separators for liquids which utilize, in their construction, one or more catch and discharge bodies which are made of two bowl shaped rotary bodies placed opposite each other and separated by an operating gap, and at least one discharge and catch body is positioned rotatably between two pole shoes placed opposite each other of at least one magnetic yoke. The rotatable arrangement of bowl-like catch and discharge bodies in magnetic yokes enables the utilization of a major number of magnetic yokes, as a result of which the magnetic adhesive force at the catch and discharge bodies is increased dramatically by the formation of a homogeneously magnetic operating gap which considerably improves the effectiveness.

My present invention also embodies the application of certain principles disclosed in my U.S. patent application Ser. No. 766,352, filed Feb. 7, 1977.

In my present invention, various features of the separators disclosed in my aforesaid application are utilized, but certain advantageous results are achieved by positioning at least one of the catch and discharge bodies rotatably between two pole shoes placed opposite each other of a closed magnetic system.

Additional details, applications and advantages of the invention are explained below more in detail by means of the particularly preferred embodiments represented in the accompanying drawings in which.

Figure 1:
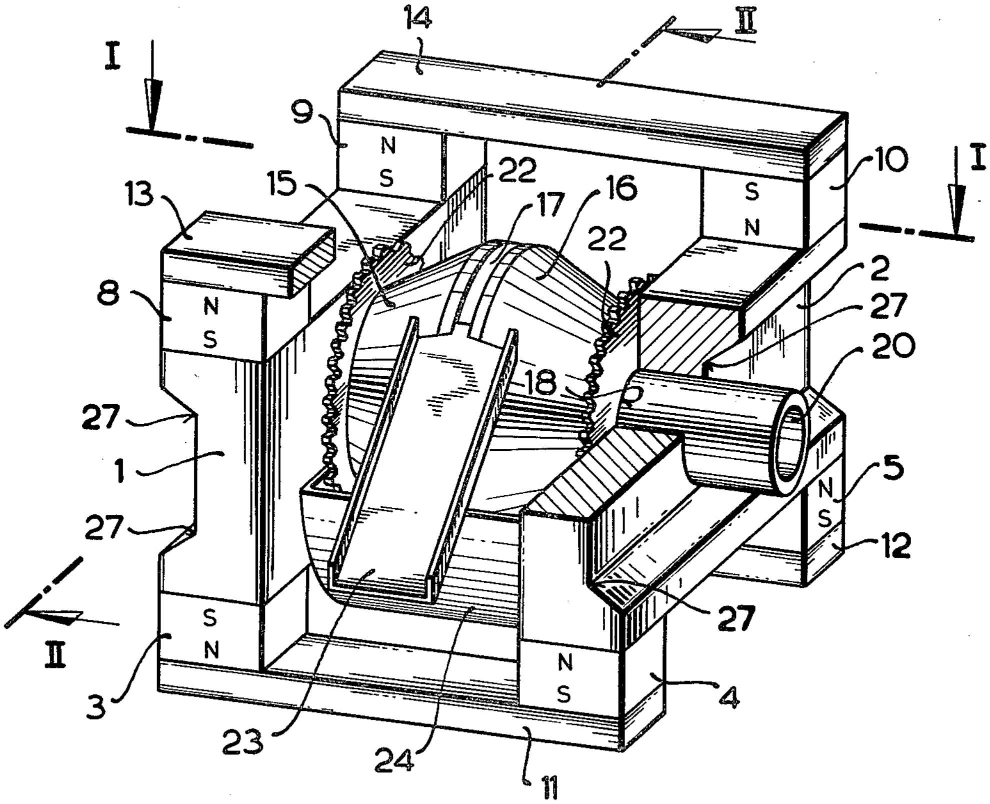
FIG. 1 is a schematic view, partly in section, of one embodiment of the separator.
Figure 2:
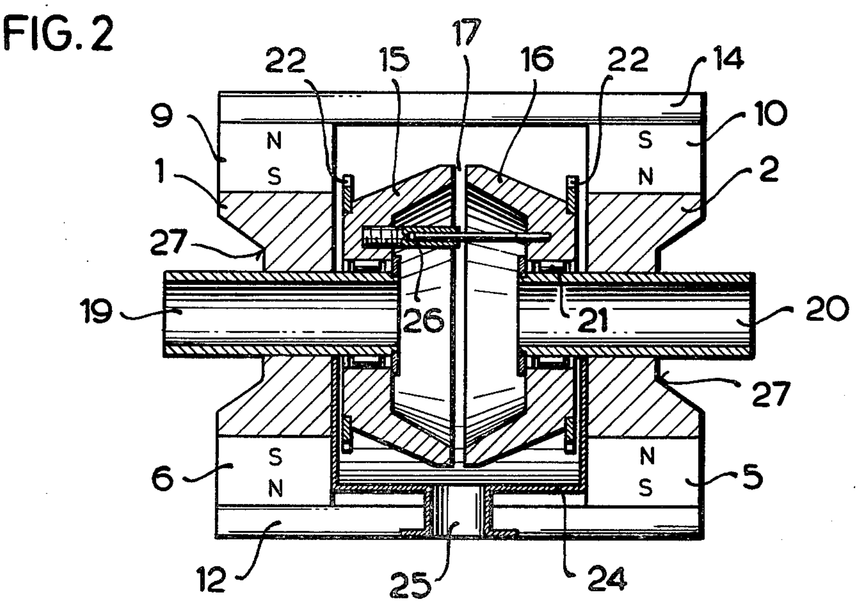
FIG. 2 is a vertical section through the separator along line I—I of FIG. 1, looking in the direction of the arrows.

Referring first primarily to FIGS. 1 and 2, the separator comprises a magnetic system with a completely closed circuit which is formed by pole shoes 1, 2, and block-shaped permanent magnets 3, 4, 5, 6, 7, 8, 9 and 10 connected through mild iron bridges 11, 12, 13 and 14 which interconnect said pole shoes at the top and bottom sides of said pole shoes, said mild iron bridges serving as a magnetic ground for the permanent magnets 3, 4, 5, 6, 7, 8, 9 and 10. The aforesaid magnets adhere to the pole shoes 1, 2 with identical poles in each case, but said poles shoes 1, 2 have opposite polarity between them.

Disposed between the pole shoes 1, 2 is a catch and discharge body, comprising bowl-shaped rotary bodies 15, 16, placed opposite each other, and so positioned and arranged as to be rotatable, there being an operating air-gap located between said rotary bodies 15, 16. Said rotary bodies 15, 16 are made from material conductive to magnets, for example, iron or steel, and they are formed with central openings 18 through which pipes or conduits 19, 20, positioned in pole shoes 1, 2, extend. The pipes or conduits can be made from magnetic material, for instance, iron or steel, or from non-magnetic materials. The rotation of the rotary bodies 15, 16 is accomplished on ball bearings 21 and through any suitable drive means (not shown) which transmits its torque to the gear-like members or serrated crowns 22 attached externally to the rotary bodies 15, 16.

Each of the pole shoes 1, 2 is connected to four permanent magnets and, accordingly, each of said pole shoes receives a multiple polarization. The poles facing away from the pole shoes 1, 2, are shorted among each other by the mild iron bridges 11, 12, 13, 14. As a result, each magnetic system is provided with a completely closed circuit, having its effective operating range between the pole shoes 1, 2, within which the rotary bodies 15, 16 are located. They are polarized by the pole shoes 1, 2, in each case oppositely, so that a powerful homogeneous magnetic operating field develops in the air-gap 17.

The actual separation process progresses in the following manner: While the rotary bodies 15, 16 are rotating on the pipes or conduits 19, 20, the liquid to be separated enters in opposite directions of flow through the pipes or conduits 19, 20, which liquid may contain or consist of magnetizable, with or without non-magnetizable, material, and passes into the interiors of the rotary bodies 15, 16 and flows out preponderantly through the operating gap 17 located below the axis of the pipes or conduits. As the liquid passes through the operating air-gap 17, it is exposed to the powerful magnetic field. As a result, the ferromagnetic and other impurities which magnetically adhere and deposit at the edges of the rotary bodies 15, 16 are removed from the liquid so that even the impurities which are not magnetic are collected from the liquid to be separated. A stripper 23, which engages in the area of essentially the highest point of the rotary bodies 15, 16 into the operating gap 17, continuously cleans or strips the rotary bodies 15, 16. The purified liquid collects below the rotary bodies 15, 16 in a container 24 which is equipped with a drain 25.

Figure 4:
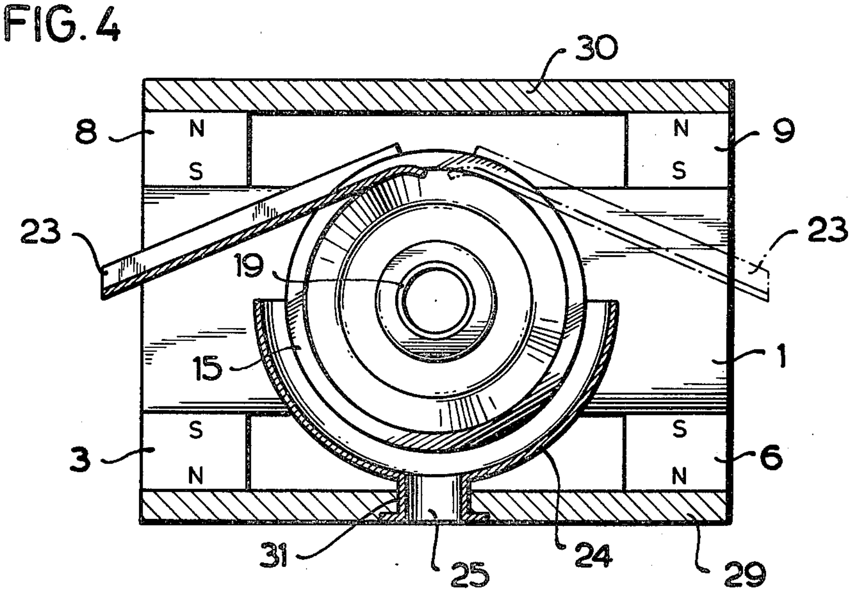
FIG. 4 is a vertical section through the separator of FIG. 1 along line II—II, looking in the direction of the arrows.

Instead of rotating the rotary bodies 15, 16 in the same direction, the separator can readily be modified so that said rotary bodies rotate in opposite directions in relation to each other. In such case, the bridge-like buildup of separated magnetizable (which may be admixed with non-magnetizable) solids in the operating air-gap 17 is loosened up in its consistency, thus facilitating a continuous freeing and discharge of the purified liquid. Where opposite directions of rotation of the rotary bodies 15, 16 are utilized, each rotary body 15, 16 is provided with its own drive and stripper 23, in which case, as shown in FIG. 4 by the representation in broken lines, the second stripper 23 is arranged opposite the other stripper.

As shown more particularly in FIG. 2, the rotary bodies 15, 16 can be interconnected, preferably interiorly, by a screw connection 26, or, if desired by a similar or equivalent connection, and to position them only on one of the pipes or conduits 19, 20. Thereby the drive of the rotary bodies 15, 16 is accomplished by only one of the rotary bodies 15, 16, in which case only one gear-like member or serrated crown 22 and one drive means are required. By such modified construction, the above-described manner of operation of the separator is in no way adversely affected.

The pole shoes 1, 2 may have, above and below the area of adherence of the permanent magnets 3, 4, 5, 6, 7, 8, 9, 10, a cross-sectional tapering near or adjacent the position indicated by numeral 27. The effect of this cross-sectional tapering is to more strongly concentrate the magnetic lines of force more strongly opposite the rotary bodies 15, 16.

Figure 3:
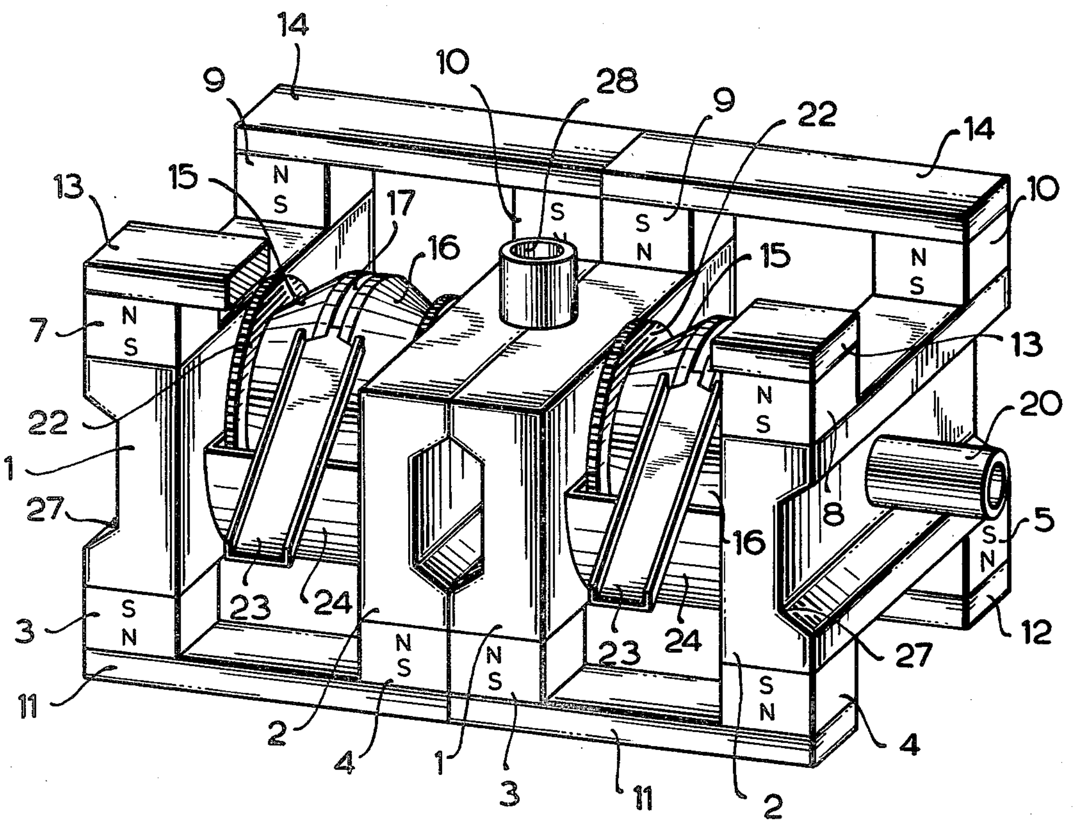
FIG. 3 is a schematic view of another embodiment of the invention in which the separator is constructed to provide two juxtaposed catch and discharge bodies.

It is also within the scope and teachings of the present invention to combine a plurality, namely, two or more, of catch and discharge bodies in one magnetic separator. FIG. 3 shows such a construction which is achieved by the juxtaposition of two catch and discharge bodies based on the above-described embodiment of FIG. 1. As there shown, the two sets of rotary bodies 15, 16 have disposed generally centrally thereof a joint feeder tube 28 for the liquid to be separated. The aforementioned pipes or conduits 19, 20 are maintained in an unchanged arrangement.

In a further modification of the separator apparatus of the present invention, as shown in FIG. 4, an iron, preferably mild iron, common base plate 29 and cover plate 30 are used in place of the mild iron bridges 11, 12, 13, 14, which, as mentioned above, are used as a magnetic ground for the permanent magnets 3, 4, 5, 6, 7, 8, 9 and 10. The base plate 29 is provided with an opening 31 into which the drain pipe 25 is fitted.

Figure 5:
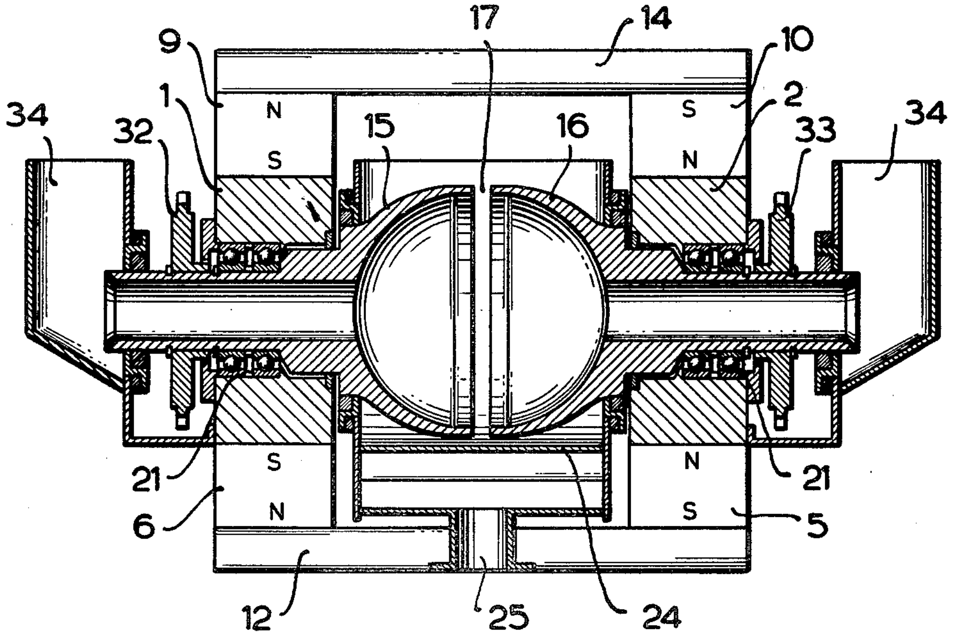
FIG. 5 is a vertical section through a modified form of separator, where the catch and discharge body forms one piece with the feed pipes and the drive is located outside the magnetic system.

In the modification of the separator shown in FIG. 5, the drive is mounted outside the magnetic system. As shown, the rotary bodies 15, 16 form one piece with the feeder pipes or conduits 19, 20. The rotary bodies 15, 16 are, again, positioned in ball bearings 21 inside the pole shoes 1, 2. Sprocket wheels 32, 33 for a drive (not shown) are provided for the drive outside the magnetic systems, ahead of the pole shoes 1, 2 in each case. The liquid to be purified is introduced into the pipe-like extensions of the rotary bodies 15, 16 through feed tanks 34.

Other embodiments of the present invention will become apparent in light of the guiding principles and teachings contained herein.

What is claimed is:

1. A permanent magnetic separator for liquids to be purified comprising at least one set consisting of two hollow bowl-shaped bodies each of which hollow bowl-shaped bodies is positioned rotatably on a hollow shaft, said hollow bowl-shaped bodies being arranged opposite each other symmetrically and with an operating air gap therebetween, said hollow shafts serving as inflows for the introduction of the liquid to be purified into the interiors of said hollow bowl-shaped bodies, the outflow of said liquid occurring through said operating gap, a container partially surrounding said hollow bowl-shaped bodies and into which said liquid passes after separation therefrom of the ferromagnetic impurities, spaced permanent magnets positioned outside of said bowl-shaped bodies, separate pole shoes each in contact with their associated permanent magnetics, said pole shoes being disposed between two pairs of permanent magnets each pair of which permanent magnets is disposed, respectively, below and above said hollow shafts and being connected by mild iron bridges positioned, respectively, below and above pairs of permanent magnets to form a closed magnetic system, said hollow bowl-shaped bodies being oppositely polarized, said pole shoes carrying said hollow shafts, said ferromagnetic impurities being collected from the liquid to be purified in said operating air gap and on and adjacent to the edges of said hollow bowl-shaped bodies, and a stripper associated with said operating air gap to remove said ferromagnetic impurities during rotation of said hollow bowl-shaped bodies for discharge and removal of said ferromagnetic impurities.

2. A separator according to claim 1, in which said spaced permanent magnets are of generally block shape.

3. A separator according to claim 1, in which the hollow bowl-shaped bodies are rotated in opposite directions in relation to each other.

4. A separator according to claim 1, in which at least one of the hollow bowl-shaped bodies is provided with a serrated crown through which such hollow bowl-shaped body is rotated.

5. A separator according to claim 1, in which the stripper is arranged with its effective end in the air-gap.

6. A separator according to claim 1, in which there are two strippers, and in which the hollow bowl-shaped bodies are rotated in opposite directions in relation to each other.

* * * * *